United States Patent Office 3,379,950
Patented Apr. 23, 1968

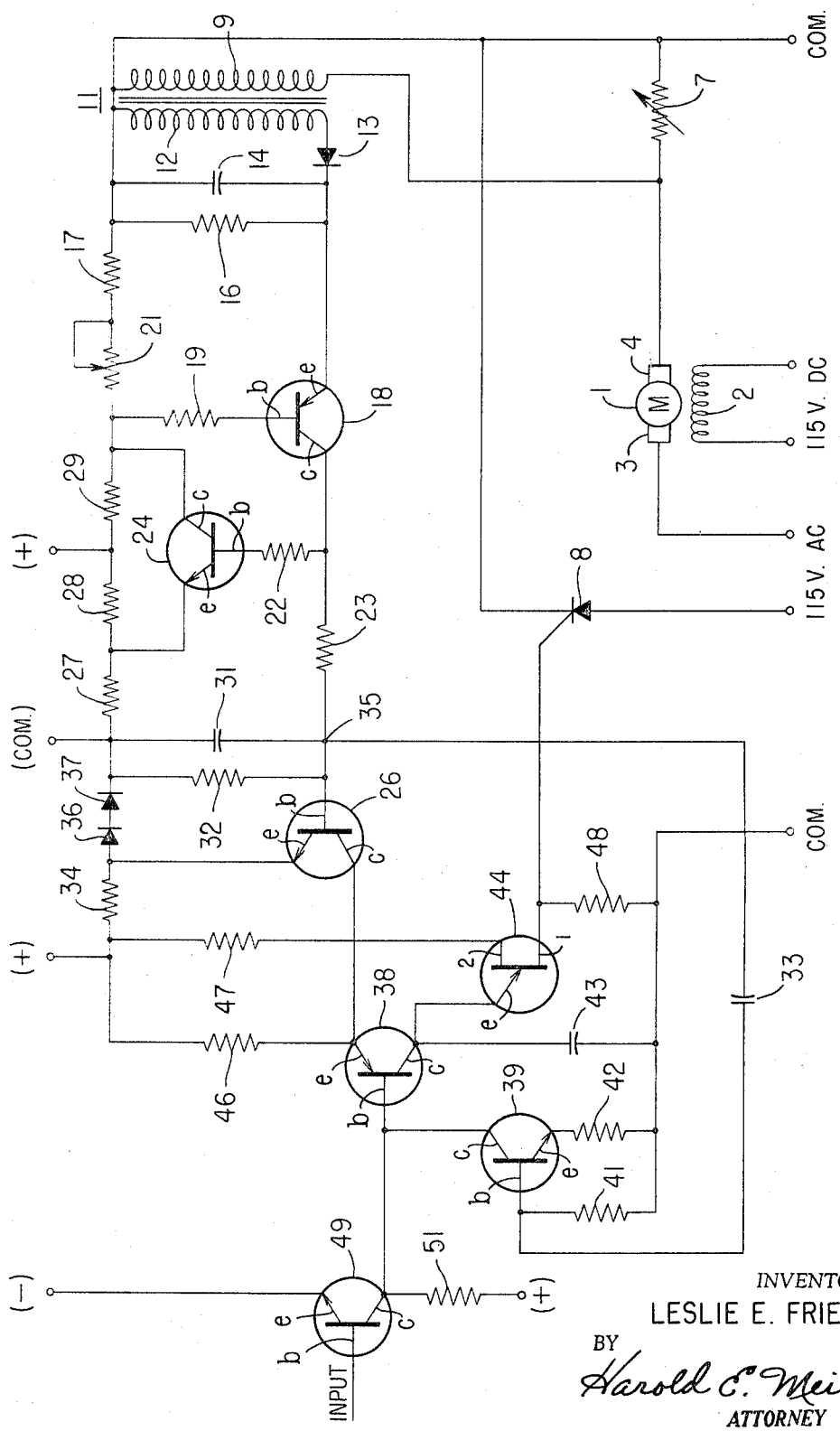
INVENTOR.
LESLIE E. FRIEDLINE
BY
Harold C. Meier
ATTORNEY

3,379,950
LOAD CONTROL CIRCUIT INCLUDING MEANS RESPONSIVE TO LOAD CURRENT IN EXCESS OF A PREDETERMINED AMOUNT FOR INCREASING SAID LOAD CURRENT
Leslie E. Friedline, Mentor, Ohio, assignor to Bailey Meter Company, a corporation of Delaware
Filed July 6, 1965, Ser. No. 469,558
9 Claims. (Cl. 318—434)

This invention relates to a current control system. In particular this invention relates to a system for controlling the current through a load by means of varying the conduction cycle of a controlled rectifier.

Since the introduction of the silicon controlled rectifier, SCR as it is commonly designated, many motor and load control systems have been developed. An exceptionally well-engineered circuit of this type is found in the co-pending patent application of Koppel et al., Ser. No. 335,065, filed Jan. 2, 1964, and assigned to the same assignee as my invention.

In operation these SCR control circuits perform exceptionally well and have found wide acceptance in the control field. Generally they are solid-state circuits with long life reliability and trouble-free operation.

However, when controlling any power producing device it often becomes necessary to develop a momentary surge of power. In other situations unforseen accidents may stall the power drive, whether it be a slip clutch or electric motor, and to prevent permanent damage the supply current must be reduced to some safe level. It is the principal object of my invention to provide a load control circuit that supplies a momentary surge of power by controlling the firing of a controlled rectifier.

Another object of my invention is to provide a system that responds to the current flow through an electric load and controls the conduction of a controlled rectifier therefrom.

Still another object of my invention is to provide a load control circuit that responds to the load current to reduce said current flow when it exceeds a predetermined value for a predetermined period of time.

Various other objects and advantages of my invention will be apparent from the following description of a preferred embodiment and pointed out in the appended claims.

Referring to the figure, I show schematically a shunt wound direct current motor having an armature 1 and a field 2. A 115-volt direct current source, not shown, energizes the field 2 and a 115-volt alternating current source, also not shown, energizes the armature 1 through two brush contacts 3 and 4, an adjustable resistor 7 and a silicon controlled rectifier 8. The cathode of the silicon controlled rectifier 8 and one terminal of the adjustable resistor 7 are connected to common.

Connected in parallel with the adjustable resistor 7 is an isolation transformer 11 having a primary winding 9 and a secondary winding 12. One terminal of the primary winding 9 and the secondary winding 12 are interconnected and in turn connected to common. A diode rectifier 13 rectifies the pulsating voltage developed across the secondary winding 12 of the isolation transformer 11 and a filter capacitor 14 and resistor 16 smooths-out the pulsating unidirectional voltage produced by said rectifying action.

Serially connected between a direct current source, not shown, and the junction of the filter capacitor 14 and filter resistor 16, which is connected to common, is a bias resistor 17, an adjustable resistor 21 and a dropping resistor 29. A transistor 18 connects to the junction of the dropping resistor 29 and the adjustable resistor 21 through a base drive resistor 19 connected to base electrode $b$. Also connected to the junction of the dropping resistor 29 and the adjustable resistor 21 is the collector electrode $c$ of transistor 24 which has its base electrode $b$ interconnected with the collector electrode $c$ of the transistor 18 through a base drive resistor 22. Emitter electrode $e$ of the transistor 18 connects to the cathode of diode rectifier 13.

Two series connected dropping resistors 27 and 28 connect to common and the direct current supply to which the dropping resistor 29 is connected. The junction of the two resistors 27 and 28 is interconnected with the emitter electrode $e$ of the transistor 24. Also connected to the common terminal is a time delay circuit consisting of a capacitor 31 and a resistor 23. A discharge path for the capacitor 31 is provided for by means of a resistor 32 connected in parallel with the capacitor. The timing circuit, in addition, connects to the base electrode $b$ of a transistor 26 and the collector electrode $c$ of the transistor 18 through the resistor 23 which also functions to limit the current through the transistor 26 after it has turned on. Two series connected diodes 36 and 37, connected to common and to the emitter electrode $e$ of the transistor 26, supplies the necessary bias voltage for said transistor. The transistor 26 functions to reduce the conduction time of the silicon controlled rectifier 8, as will be explained later. The collector electrode $c$ of the transistor 26 connects to the emitter electrode $e$ of an integrating transistor 38 and a bias resistor 46. A direct current supply, not shown, biases the integrating transistor 38 through the bias resistor 46 and in addition biases the transistor 26 through a bias resistor 34 connected to the anode of the diode 36. An integrating capacitor 43 and the emitter electrode $e$ of a unijunction transistor 44 are interconnected and in turn connected to the collector electrode $c$ of the integrating transistor 38. The integrating capacitor 43 and a bias resistor 48, which is connected to the base 1 electrode of the unijunction transistor 44, are connected to a common. Connected to the base 2 electrode of the unijunction transistor 44 is a bias resistor 47 which is supplied from a direct current source, not shown. Base drive voltage to the integrating transistor 38 is supplied from the collector electrode $c$ of an input transistor 49.

Also connected to the collector electrode $c$ of the input transistor 49 is a bias resistor 51 which inturn is connected to a direct current supply, not shown. The input signal to my load control circuit is supplied by a source, not shown, connected to the base electrode $b$ of the input transistor 49.

Of particular importance to the successful operation of my load control circuit is the transistor 39. As will be explained later, it functions to increase the current flow to the load to supply a momentary increase in developed power. The transistor 39 has its collector electrode $c$ connected to the base electrode $b$ of the integrating transistor 38, its emitter electrode $e$ is connected to a bias resistor 42 and its base electrode $b$ is connected to a bias resistor 41 and a blocking capacitor 33. The bias resistors 41 and 42 are connected to the common terminal to which the integrating capacitor 43 is connected. The blocking capacitor 33 connects to terminal 35.

CIRCUIT OPERATION

A control signal to the base electrode of the input transistor 49 develops an emitter-collector current flow through the bias resistor 51 thereby developing a base drive voltage for the integrating transistor 38. Conduction of the integrating transistor 38 generates a current flow through the bias resistor 46 and starts a charge build-up on the integrating capacitor 43. When the voltage across the integrating capacitor reaches the firing voltage of the unijunction transistor 44 it switches on and current flows through the emitter *e* and the base 1 electrodes thereby discharging capacitor 43 and developing a voltage across the bias resistor 48. The voltage across the bias resistor 48 supplies the necessary energizing pulse to the gate electrode of the silicon controlled rectifier 8 and said rectifier conducts if its anode is positive with respect to its cathode.

With conduction of the silicon controlled rectifier 8, current flows through the adjustable resistor 7 and the armature 1. Current flowing through the adjustable resistor 7 generates a voltage drop across said resistor which is proportional to current flow. This voltage has a wave shape resembling that developed by half-wave rectification of a sinusodial wave and energizes the primary winding 9 of the isolation transformer 11.

A voltage proportional to that developed across the primary winding will be generated across the secondary winding 12. Through the rectifying action of the diode rectifier 13 and the filtering by the RC filter consisting of capacitor 15 and resistor 16, a direct current voltage will be developed across the resistor 16 proportional to that developed across the adjustable resistor 7. This voltage will be added to the voltage drops across the adjustable resistor 21 and resistor 17; when the sum of these three voltages causes the emitter electrode of the transistor 18 to become positive with respect to its base, conduction will occur. Conduction of the transistor 18 causes the base of the transistor 24 to become positive with respect to its emitter and it switches into a conducting state thereby reducing the voltage at the base of the transistor 18. As a result, the electric transistor 18 is driven farther into its conducting state.

It will be noted that by varying the position of the wiper arm of the adjustable resistor 21, the magnitude of the voltage drop across the resistor 16 that switches on the transistor 18, can be either increased or decreased. Because the voltage across the resistor 16 is proportional to the current flow through the armature 1 it can be seen that conduction of the transistor 18 can be adjusted to take place at a predetermined level of armature current.

Another important feature of my transistorized switch, consisting of transistors 18 and 24, is the delay action cutoff. If the adjustable resistor 21 is set to cause conduction of transistor 18 at 125% of armature rating; the operation of transistor 24 prevents it from turning off until the armature current falls below some lower preset value, for example, 100% of rating. This action results from the lowering of the voltage at the base electrode of transistor 18 by the conduction of transistor 24.

Current flow through transistor 18, in addition to turning on the transistor 24, also causes a charge build-up to begin on the delay capacitor 31 and the blocking capacitor 33. So long as the voltage across the blocking capacitor 33 is changing, a drive voltage will be developed at the base electrode of transistor 39. Conduction through transistor 39 causes current flow through the bias resistor 51 from the direct current supply connected thereto, through the collector-emitter junction of transistor 39 and finally to ground through the bias resistor 42. This drives the base voltage of the integrating transistor 38 more negative causing heavier conduction through its collector-emitter junction. The charging rate of the integrating capacitor 43 increases and the unijunction transistor 44 fires with increased repetition resulting in the silicon controlled rectifier conducting sooner in the positive cycle of the 115-volt alternating current supply. Increased conduction of the S.C.R. causes a greater current flow through the armature winding 1. Thus, by the action of transistor 39, the torque developed by the shunt-wound motor is increased.

After the delay capacitor 31 has been charged to the voltage level of the collector electrode of transistor 18 it will be at its steady-state condition. Likewise the voltage across the blocking capacitor 33 will have reached its steady-state value. Transistor 39 will now turn off and the current flow through the armature winding 1 returned to the value developed by the control signal at the base of the input transistor 29. The increased torque developed as a result of conduction of transistor 39 will last for only a very short duration and is known as a "breakaway torque."

When the delay capacitor 31 reaches its fully charged condition the voltage at the base of transistor 26 will be positive with respect to its emitter electrode voltage; this changes transistor 26 from its nonconducting to its conducting state. With transistor 26 conducting, part of the current flow through the bias resistor 46 will be shunted from transistor 38. The time required for the integrating capacitor 43 to reach the firing voltage of the unijunction transistor 44 is increased and the S.C.R. fires later in the positive cycle of the 115-volt alternating current armature supply. The average value of the voltage across the armature winding 1 is thereby reduced and the motor current drops to some safe operating level.

In summary, an armature current of approximately 125% of rating turns on transistor 18 which turns on transistor 24. Conduction of transistor 24 lowers the armature winding current required to keep transistor 18 conducting. Independent of this action, conduction of transistor 18 also turns on transistor 39 and the armature current is increased by increasing the conduction cycle of the silicon controlled rectifier 8. A "breakaway torque" of a few seconds' duration will thus be developed. The duration of this increased torque will depend upon the charging time of the time delay capacitor 31. When the delay capacitor 31 reaches its steady-state condition, transistor 39 turns-off and transistor 26 is forward biased. Conduction of transistor 26 shunts part of the current flow through the bias resistor 46 from transistor 38 resulting in a reduced armature current.

It seems hardly necessary to point out that the current values given in my description are merely for purposes of explaining the operation of my invention. They are not in any way intended to limit the extent of my invention to these values. Likewise the shunt wound direct current motor was used as a load merely for purposes of description. Many other changes can be made in the components and connections that I have described without departing from the scope of my invention as set forth in the appended claims.

What I claim as new and desire to secure by Letters Patent of the United States is:

1. A current control system, comprising:
   an electric load;
   means connected to said load and responsive to the flow of current through said load;
   a switch electrically coupled to said current responsive means and producing an output signal proportional to the current flow through said load in excess of a predetermined value;
   current control means connected to said switch and responsive to the output therefrom to increase the current flow in said electric load; and
   current limiting means connected to said switch and responsive to the output therefrom to cut back the current through said load after it has exceeded a predetermined value for a predetermined period of time.

2. A current control system, comprising:
   a controlled rectifier having a conduction control terminal;
   an electric load connected in series with said control rectifier;
   current responsive means connected in a series circuit with said electric load and said control rectifier;
   a switch electrically coupled to said current responsive means and producing an output signal proportional to the current through said load in excess of a predetermined value;

current control means connected and responsive to the output signal from said switch, said current control means connected to the control terminal of said control rectifier and controlling the conduction thereof, to increase the current flow through said electric load; and current limiting means also connected to said switch and the control terminal of said control rectifier to reduce the current flow through said electric load after it has exceeded a predetermined value for a predetermined period of time.

3. A current control system as set forth in claim 2 wherein said controlled rectifier is a semiconductor having a cathode, anode and gate, the anode and cathode connected in a series circuit with said electric load and said current responsive means, the gate connected to said current control means and said current limiting means.

4. A motor current control system, comprising:
a semi-conductor control rectifier having a cathode, an anode and a gate;
a shunt wound motor having an armature connected in series with the anode and cathode of said control rectifier;
current responsive means connected in series with said control rectifier and the armature of said shunt wound motor;
a switch electrically coupled to said current responsive means and producing an output signal proportional to the current flow through the armature of said shunt wound motor in excess of a predetermined value;
current control means connected and responsive to the output signal from said switch, said current control means connected to the gate of said control rectifier to increase the current flow through the armature of said shunt wound motor and consequently the torque produced thereby; and
current limiting means also connected to said switch and the gate of said control rectifier to reduce current flow through the armature of said shunt motor and consequently reduce the torque produced thereby; after the current from said armature has exceeded a predetermined value for a predetermined period of time.

5. A motor current control system as set forth in claim 4 including a timing means connected to said current limiting means for determining the length of time the current through the armature of said shunt motor exceeds its predetermined limit.

6. A motor current control system, comprising:
a semi-conductor controlled rectifier having a cathode, an anode and a gate;
a shunt wound motor having an armature connected in series with the anode and cathode of said control rectifier;
a resistor connected in series with said control rectifier and the armature of said shunt motor;
a transformer having a primary and secondary winding, said primary winding connected in parallel with said resistor;
a switch connected to the secondary winding of said transformer and producing an output signal proportional to the current flow through said resistor in excess of a predetermined value;
pulse generating means connected to the gate of said control rectifier for repetitively triggering said rectifier from its non-conducting to its conducting state;
a transistor connected to said switch and said generating means, conduction of said transistor increasing the triggering repetition rate of said control rectifier and the current flow through the armature of said shunt motor; and;
RC time delay circuit connected to said switch; and;
a second transistor connected to said time delay circuit and said generating means to reduce the triggering repetition rate of said control rectifier after the current through said resistor exceeds a predetermined value for a predetermined period of time.

7. A motor control system as set forth in claim 6 including an adjustable power supply connected to said second electric transistor to provide an adjustable bias, the setting of said bias determining the maximum allowable current through said resistor.

8. A motor current control system as set forth in claim 7 including a capacitor connected between said first transistor and said switch, said capacitor providing a means for cutting-off said first transistor when the output of said switch is in a non-transient condition.

9. A motor current control system, comprising:
a semi-conductor control rectifier having a cathode, an anode and a gate;
a shunt wound motor having an armature connected in series with the anode and cathode of said control rectifier;
a resistor connected in series with said control rectifier and the armature of said shunt wound motor;
a transformer having a primary and secondary winding, said primary winding connected in parallel with said resistor;
a rectifier connected to the secondary of said transformer for half-wave rectification of the output of said transformer;
a first transistor having an input and output terminal, said transistor connected to said rectifier and the secondary winding of said transformer, the output of said first transistor varying in proportion to current through said resistor;
a second transistor connected to said first transistor and providing a means for sustaining conduction of said first transistor after the current through said resistor drops below a predetermined value;
pulse generating means connected to the gate of said control rectifier for repetitively triggering said rectifier from its non-conducting to its conducting state;
a third transistor connected to said first transistor and said generating means, conduction of said third transistor increasing the triggering repetition rate of said control rectifier and the current flow through the armature of said shunt motor;
an RC time delay circuit connected to said first transistor; and
a fourth electric transistor connected to said time delay circuit and said generating means to reduce the triggering repetition rate of said control rectifier after the current through said resistor exceeds a predetermined value for a predetermined period of time.

No references cited.

ORIS L. RADER, *Primary Examiner.*

G. R. SIMMONS, *Assistant Examiner.*